Figure 1:
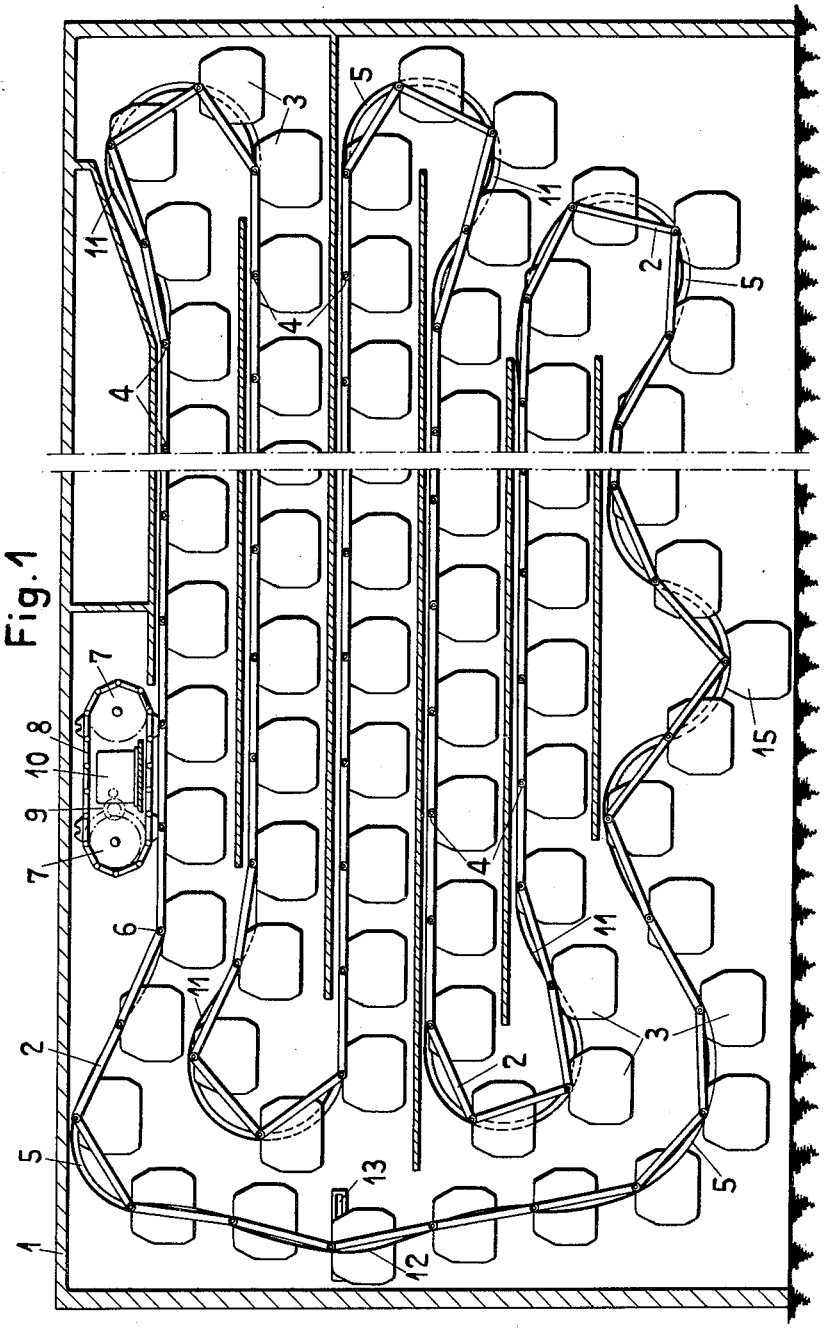

Jan. 17, 1956     E. MAIER     2,731,160

MECHANICALLY OPERATED MULTI-STOREY GARAGE

Filed Nov. 15, 1954     6 Sheets-Sheet 1

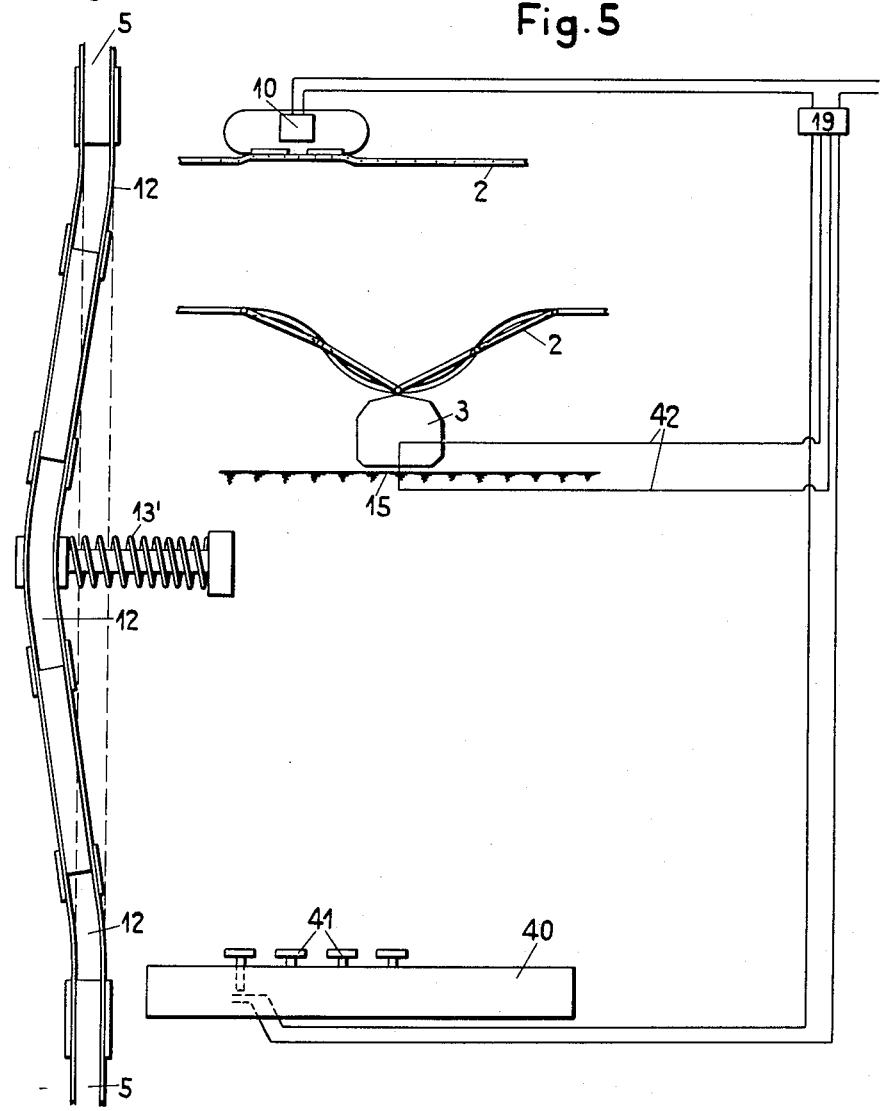

Jan. 17, 1956            E. MAIER            2,731,160
MECHANICALLY OPERATED MULTI-STOREY GARAGE
Filed Nov. 15, 1954            6 Sheets-Sheet 4
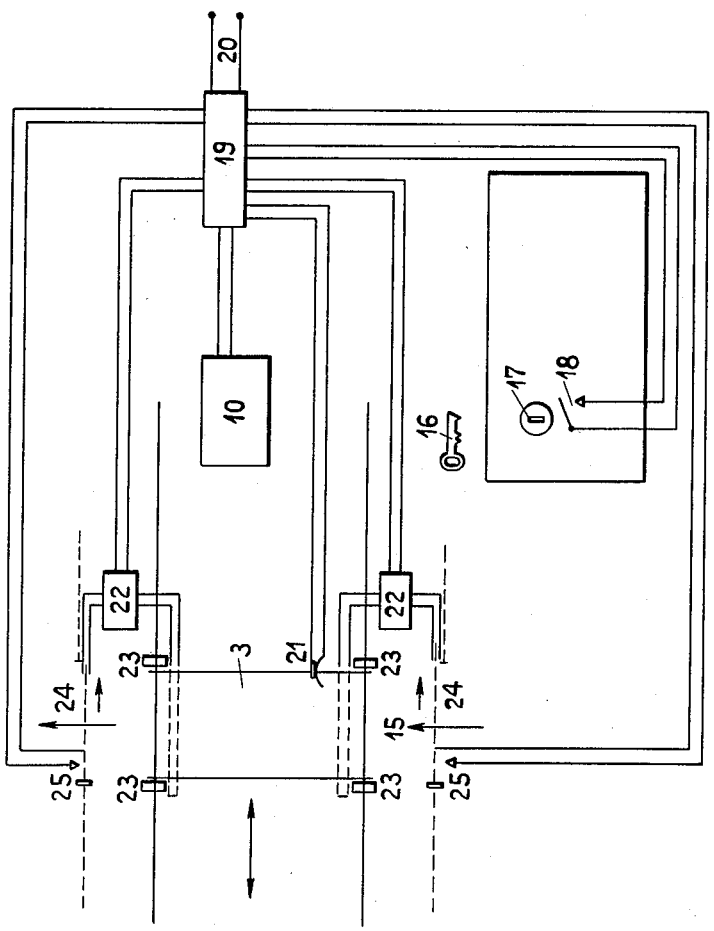

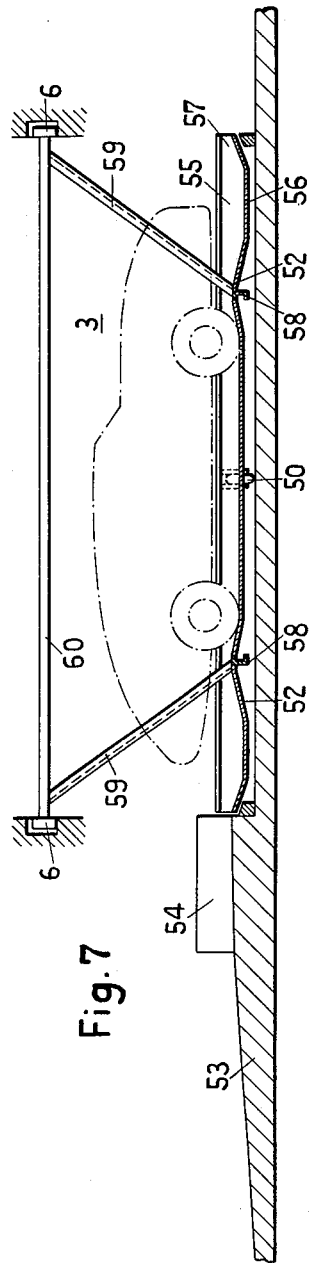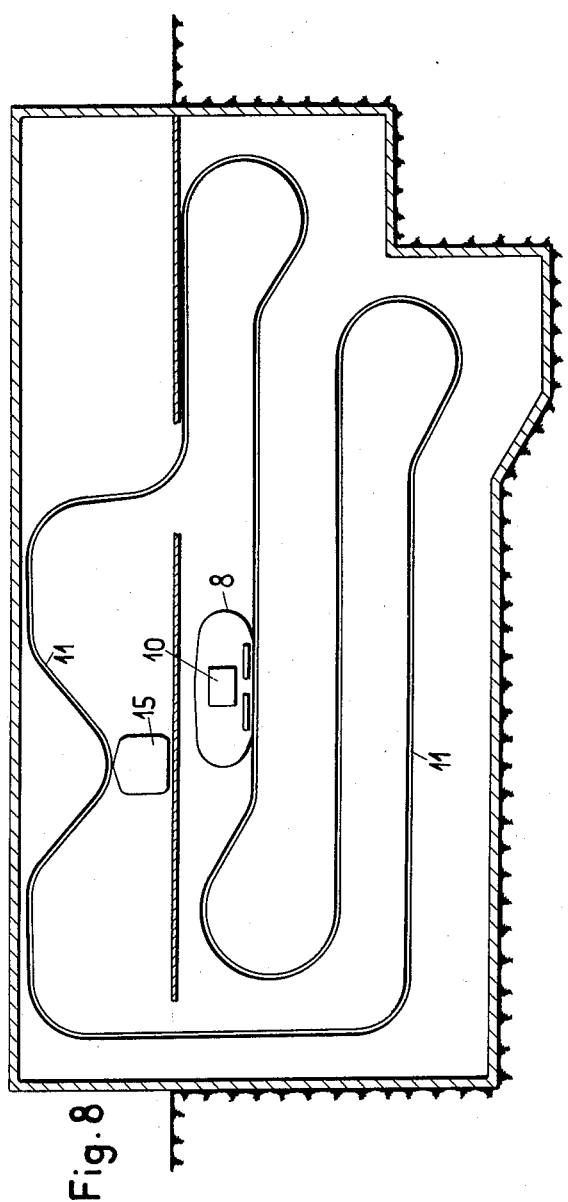

Jan. 17, 1956  E. MAIER  2,731,160
MECHANICALLY OPERATED MULTI-STOREY GARAGE
Filed Nov. 15, 1954  6 Sheets-Sheet 6

United States Patent Office 2,731,160
Patented Jan. 17, 1956

2,731,160

MECHANICALLY OPERATED MULTI-STOREY GARAGE

Erwin Maier, Schaffhausen, Switzerland

Application November 15, 1954, Serial No. 468,904

Claims priority, application Switzerland November 30, 1953

16 Claims. (Cl. 214—16.1)

The invention relates to a mechanically operated multi-storey garage in which a pair of motor driven endless conveyer chains carries platforms or boxes suspended on its joints each of which platforms or boxes can accommodate a motor vehicle. The said conveyer chains usually run over deflector pulleys which must have a predetermined minimum diameter in order that the individual platforms or boxes can pass one another when the said conveyer chains are moving. The storeys of the garage usually have a height which corresponds to this diameter of the pulleys. It has, however, been found that between the individual platforms or boxes as well as between the same and the floors of the storeys too large a dead distance remained which could not be usefully exploited in any way, and accordingly was lost. Moreover the usual short links of the conveyer chains which could not all be guided did not afford any security against collapsing or getting out of alignment of unsupported links.

The present invention has the principal object of providing a mechanically operated multi-storey garage in which the space required between adjacent platforms or boxes and between the same and the floors is kept to a minimum.

It is another object of the invention to provide a mechanically operated multi-storey garage in which the links of the conveyer chains are safeguarded against unintentionally getting out of alignment.

It is yet another object of the invention to provide an effective and reliable driving mechanism for a garage of the type referred to.

Wtih these and other objects in view I provide a mechanically operated multi-storey garage, comprising in combination: a plurality of floors vertically spaced from one another, a pair of conveyer chains passed side by side overhead the individual floors and from one floor to another, carriers such as platforms or boxes capable of accommodating vehicles suspended at the articulation points of the said conveyer chains having straight portions parallel to the said floors and curved portions leading from one floor to another having a radius of curvature larger than half the height of one storey followed by inversely curved transition portions leading back to the level of the adjacent floor, the links of the said conveyer chains extending from one articulation point of a carrier to that of the next carrier.

Preferably resilient compensation sections are built into the said guide rails, deflector means being operatively connected to the said compensation sections, and control means responsive to temperature and to the loading of the said conveyer chains controlling the said deflector means.

The said curved portions of the guide rails preferably extend at one end of a storey above the ceiling thereof, and at the other end below the floor thereof. The said curved portions have a substantially elliptic shape departing from that of a circular arc in such a manner that buckling and straining of the links of the conveyer chains during their movement along the said curved portions is obviated.

The said conveyer chains are preferably actuated by motor driven endless auxiliary chains having shorter links than the said conveyer chains, guide pulleys being provided which guide the said auxiliary chains, and dogs being arranged on the said auxiliary chains engaging the articulation points of the said conveyer chains and carrying the same along between the said guide pulleys.

Preferably tooth rack sections are arranged on alternate links of the said auxiliary chains extending in both directions beyond the articulation points thereof leaving in the alignment position between one another gaps corresponding to the interstices between the teeth of the said toothed rack sections, a motor driven pinion meshing with the said tooth rack sections.

Endless guide rails are provided guiding the free ends of joint bolts of the said auxiliary chains and having substantially elliptic portions joining their straight portions with one another, the said elliptic portions deviating from the shape of circular arcs in such a manner that buckling and straining of the links of the said auxiliary chains during their movement over the said elliptic portions is obviated.

Preferably the said dogs engaging the articulation points of the said conveyer chains are arranged on the same links of the said auxiliary chains as the said tooth rack sections.

Figure 2:
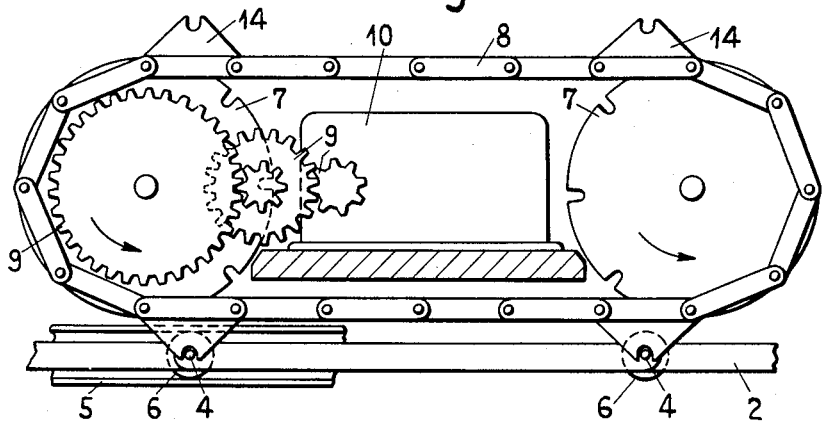
Figure 3:
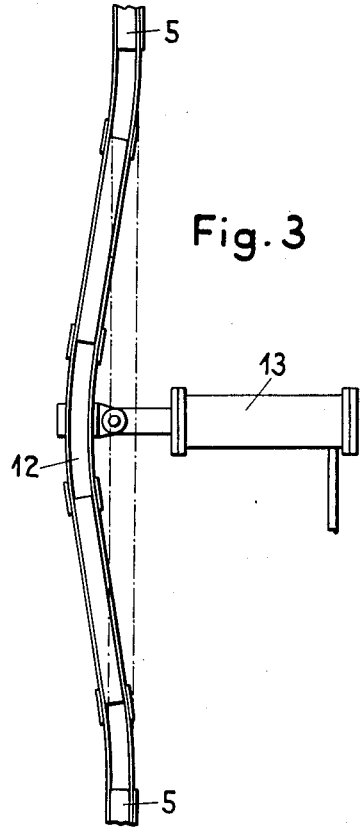
Figure 9:
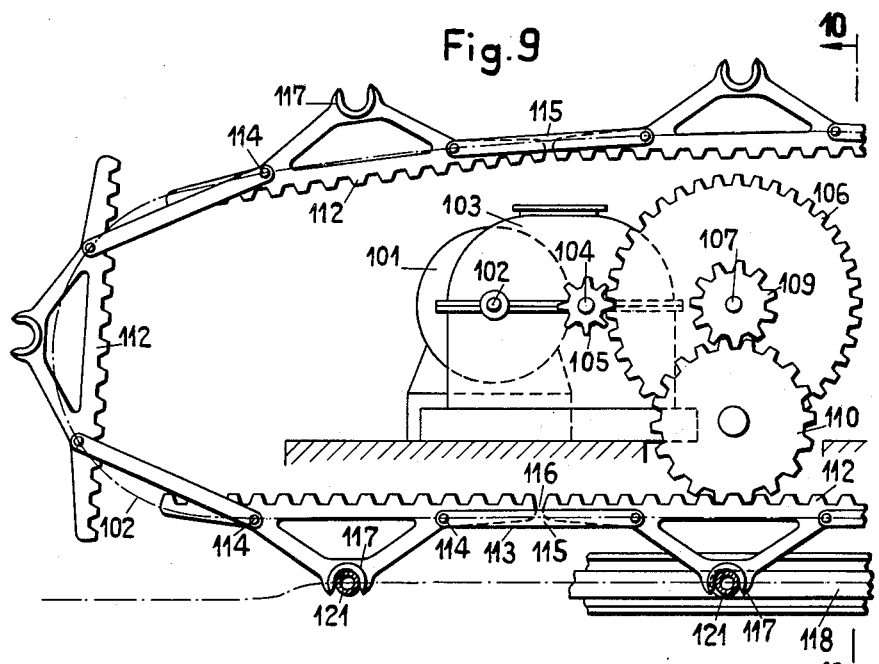
Figure 10:
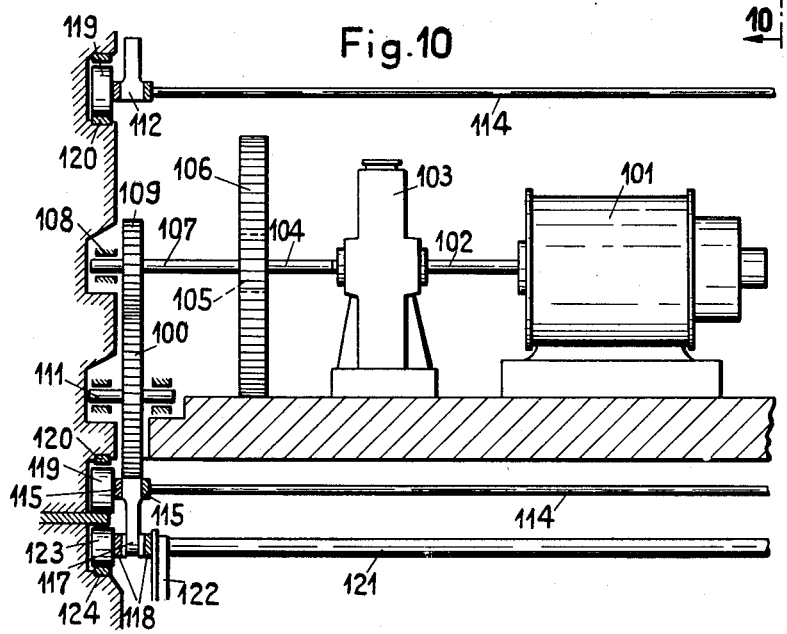

These and other objects and features of my said invention will be clearly understood from the following detailed description of some embodiments thereof given by way of example with reference to the accompanying drawings, in which:

Fig. 1 shows diagrammatically a mechanically operated multi-storey garage according to the invention in sectional elevation, Figs. 2 and 3 show details on a larger scale in the same projection as Fig. 1, Fig. 4 is a modification of the detail of Fig. 3, Fig. 5 is a general wiring diagram, and Fig. 6 is a more detailed wiring diagram of the driving mechanism of the garage, Fig. 7 shows a carrier platform in elevation at right angles to Fig. 1 on a larger scale, Fig. 8 shows an alternative arrangement to that of Fig. 1, Fig. 9 is a part elevation of a driving mechanism on a larger scale, and Fig. 10 is a part cross section along the line 10—10 of Fig. 9.

Referring firstly to Fig. 1, the mechanically operated multi-storey garage according to the invention has a building 1 which is subdivided in height by several floors. In the building a pair of endles conveyer chains 2 is arranged which carry platforms or boxes 3 for the motor vehicles. The two conveyer chains of the said pair are connected with one another at the points of articulation 4 of the platforms or boxes 3 by means of transverse members. At the extreme ends of the individual transverse members runner rollers 6 are journalled which run in guide rails 5. The conveyer chains 2 are driven by means of dogs (Fig. 2) from short-linked auxiliary chains 8 which are in turn driven by a motor 10 through two sprocket wheels 7 and a gearing 9.

As will be clear from Fig. 1, the guide rails 5 have at their turning points, i. e. at the ends of each storey a radius of curvature which is larger than half the height of each storey. By the inversely curved transition portions 11 of the said guide rails the dead distance between the lower edges of the said platforms or boxes 3 suspended on the said conveyer chains 2 and the floors of the individual storeys can be kept very small. By this increased radius the guidance of the individual platforms or boxes is so improved that they pass one another without difficulty when moving with the chains. Moreover these guide rails 5 are shaped substantially elliptic in their curved portions i. e. differing from circular arcs in such a manner that upon movement of the conveyer chains no variation in their length occurs which might produce non-permissible tension or compression of their links.

However, in order to be able to take up variations in length of the conveyer chains 2 owing to temperature differences and varying loading without undue strain, at least one resilient and shiftable section 12 (Figs. 1 and 3) is built into the guide rail 5. This section is for example under the influence of a piston sliding in a cylinder 13 and controllable by means of a pressure medium. This arrangement can be made so that the piston is controlled according to variations in temperature and to varying load, whereby practically always a constant tension of the conveyer chains is maintained.

Instead of a piston, a spring device 13' can be provided which automatically effects compensation (Fig. 4).

The reduction in the number of links of the conveyer chains to one pair between each two guided points of articulation permits the said conveyer chains to be pushed as well as pulled, which facilitates the unhampered run of the said conveyer chains and moreover forms a valuable safeguard for the case that the conveyer chains should suffer breakage anywhere. The construction of the chain links which is safe against collapsing prevents in this case the dropping down of the platforms or boxes which could otherwise happen with a construction embodying several links between each two guided joints.

For the purpose of parking a motor car in one of the carrier boxes or platforms 3 a control device 40 (Fig. 5) is provided with a number of push buttons 41 controlling switches each of which is connected through a relay 19 to the driving motor 10, and to an associated switch arranged adjacent the entrance 15 by means of conductors 42. Each switch adjacent the entrance 15 is associated to a certain carrier and is offset in position from the other switches. Each carrier 3 has an operating member (not shown) in a position corresponding to its associated switch adjacent the entrance 15. When one of the buttons 41 of the control device 40 is pressed, the motor 10 driving the conveyer chains 2 is switched on, and the conveyer chains set in motion. As soon as the carrier, the number of which corresponds to the button 41 which has been pressed, has reached the entrance 15 and its operating member has actuated its associated switch adjacent the entrance 15 the current to the motor 10 is switched off, so that the motor 10 comes to a standstill. The vehicle is then driven into the box or on to the platform 3 and is carried along without crew by the conveyer chains 2 upon renewed operation of a push button 41 of the control device 40.

Referring now to Fig. 6, the control device 40 and the push buttons 41 according to Fig. 5 are replaced by a control device having as many key holes 17 as there are carrier platforms or boxes 3 suspended on the conveyer chains 2. Into each key hole 17 a different key 16, numbered as the carrier 3 to which it corresponds, can be inserted, and by turning the key 16 in its key hole 17 a switch 18 is closed (one key hole 17 and associated switch 18 only being shown for clarity). Each switch 18 is connected electrically to a relay 19 which is connected to the mains at 20. This relay 19 is electrically connected on its output side to the motor 10 which drives the conveyer chains 2 as described, and to two smaller motors 22 controlling gates 24 arranged on both sides of the entrance 15 (shown in plan view in Fig. 6), and the locking bolts 23 for the platform or box 3 actually at a standstill at the entrance.

The input side of the relay 19 is electrically connected also to push button switches 25 arranged outside the gates 24, and to a number of switches 21 each of which corresponds to one of the carrier platforms or boxes 3.

By turning the key 16 in its associated key hole 17 until the switch 18 is closed, the following operations are automatically initiated electrically by the relay 19:

(1) Switching on the driving motor 10 of the conveyer chains 2 by connecting the same to the mains through the conductors 20. The conveyer chains 2 are accordingly moved on until the switch 21 corresponding in number to the key hole 17 is operated by its associated carrier platform or box 3, and thereby switches off the motor 10 and brakes the same through the said relay 19.

(2) Then the motors 22 are automatically switched on by the said relay 19 whereby the same firstly push the locking bolts 23 into engagement with the carrier platform or box 3 actually standing in juxtaposition with the entrance 15 fixing the same in the right position, and then open the gates 24.

Now the motor vehicle can be driven in or out, and after the attendant has left the carrier platform or box 3 and has stepped behind the gate 24, he operates a push button 25 whereby the relay 19 sets the motors 22 into motion in the opposite direction and thereby firstly closes the gates 24 and then withdraws the locking bolts 23 from the carrier platform or box 3. Thereby the conveyer chains 2 are released for further motion.

Referring now to Fig. 7, rollers 50 are arranged on the bottom of each carrier platform which upon movement of the conveyor chains 2 protect their associated carrier from colliding with the carriers running below the same or with the floors. These rollers may be so arranged that their associated carrier rests on them at the entrance 15 when loaded by the motor vehicle and when the latter is being driven in or out.

The bottoms of the carriers 3 may have humps or thresholds 52 at both ends which secure a vehicle whose parking brake is not, or not sufficiently, tightened against rolling off the said bottom, and which allow also water or snow dripping off the vehicle to be collected in the said bottom from where it can be drained off or sucked off appropriately.

Fig. 7 shows also an inclined ramp 53 over which the motor vehicles are driven on and off the carriers 3 which has lateral guides or baffles 54.

In Fig. 7 the carrier 3 is shown as a platform 55 the bottom 56 of which is laterally connected to girders 57 which are mutually connected by girders 58 on which the tie rods 59 are attached by means of which the platform is connected to the transverse rod 60 forming a joint bolt for the links of the conveyor chains 2 and carrying at its ends the rollers 6 described with reference to Fig. 2. As an alternative to the arrangement shown in Fig. 1 where the entrance into the garage is at the lowest floor, the whole garage could be sunk into the ground as shown in Fig. 8. In this case the entrance 15 for the vehicles would be on top instead of being on the bottom. Otherwise the arrangement shown in Fig. 8 corresponds substantially to that of Fig. 1.

Referring now to Figs. 9 and 10 a preferred form of the drive mechanism for the garage according to the invention comprises a motor 101 whose shaft 102 drives a reduction gearing accommodated in the gear box 103, the output shaft 104 of which carries a gear wheel 105. The latter is in mesh with a gear wheel 106 mounted on a shaft 107 which is journaled in a bearing 108 and carries a gear pinion 109 meshing with a gear wheel 110 journalled on an axle 111. The gear teeth of the wheel 110 extend into the path of tooth rack sections 112 which form part of an auxiliary link chain 113. The construction of the said chain 113 is such that any two of its joint bolts 114 are articulated to one another either by means of a tooth rack section 112 or of an ordinary chain link 115. As will be clearly seen in Fig. 9, the tooth rack sections 112 are extended beyond the joint bolts 114 in both directions of the auxiliary chain to such an extent that between adjacent teeth at the ends of consecutive tooth rack sections 112 a gap 116 remains which corresponds to the pitch of the teeth, as long as the said tooth rack sections are substantially in alignment with one another. In this manner the transition of the teeth of the gear wheel 110 from one section 112 to the other is ensured without any jerk.

Each tooth rack section 112 is provided with a dog 117 pointing outward, which overlaps and engages the link bolts 121 of the endless conveyor chains 118 to be set into motion (corresponding to the conveyor chains 2 of the other figures). As will be seen in Fig. 9, the tooth rack sections 112 alternate with the ordinary links 115 of the auxiliary chain 113. The joint bolts 114 are conveniently extended beyond the links 115 and carry on their free ends runner rollers 119 which are guided in guide rails 120. In Fig. 9 one of the said guide rails is indicated merely diagrammatically by a chain-dotted line forming its center line. The drawing shows clearly that by setting the motor 101 in operation the toothed rack formed by the tooth rack sections 112 is set in motion through the gearing 103, 104 and 106 as well as 109 and 110, and in turn drives the whole auxiliary link chain 113.

It has been found that owing to the comparatively large intervals between adjacent bolts 114 the transition arcs of the guide rails 120 for the auxiliary link chain 113 should not have the usual circular arc shape since then strains in the chain links are unavoidable. It is necessary that at least part of the transition arcs are in the shape of a curve departing somehow from the circular arc, for example substantially elliptic in shape.

On the conveyor chains 118 supports 122 are suspended on the link bolts which carry platforms or boxes (denoted 3 in the other figures) designed for the accommodation of the useful loads such as motor vehicles. The joint bolts 121 of the conveyer chains 118 are for example provided at their ends likewise with runner rollers 123 which run in guide rails 124.

While I have herein described, and illustrated in the accompanying drawings, what may be considered typical and particularly useful embodiments of my said invention, I wish it to be understood that I do not limit myself to the particular details and dimensions described and illustrated, for obvious modifications will occur to a person skilled in the art.

What I claim as my invention and desire to secure by Letters Patent, is:

1. A mechanically operated multi-storey garage, comprising in combination: a plurality of floors vertically spaced from one another, a pair of endless conveyor chains passed overhead the individual floors and from one floor to another, carriers, capable of accommodating vehicles suspended at the articulation points of the said conveyer chains, guide rails guiding the said conveyor chains and having straight portions parallel to the said floors and curved portions leading from one floor to another of a radius of curvature larger than half the height of one storey and inversely curved transition portions leading back the said curved portions to the level of the adjacent straight portion.

2. A garage as claimed in claim 1, wherein the links of said conveyor chains extend from the articulation point of one carrier to that of the next carrier whereby the said conveyor chains are capable of sustaining compressive loads without collapsing.

3. A garage as claimed in claim 1, comprising a resilient compensation section in the said guide rails, and deflector means operatively connected to the said compensation section.

4. A garage as claimed in claim 1, comprising a resilient compensation section in the said guide rails, and spring loaded deflector means operatively connected to the said compensation section.

5. A garage as claimed in claim 1, comprising a resilient compensation section in the said guide rails, deflector means operatively connected to the said compensation section, and control means responsive to temperature and to the loading of the said conveyer chains controlling the said deflector means.

6. A garage as claimed in claim 1, wherein the said curved portions of the guide rails extend at one end of a storey above the ceiling thereof, and at the other end below the floor thereof.

7. A garage as claimed in claim 1, wherein the said curved portions of the guide rails have a substantially elliptic shape departing from that of a circular arc in such a manner that buckling and straining of the links of the said conveyer chains during their movement along the said curved portions is obviated.

8. A garage as claimed in claim 1, comprising in addition: motor driven endless auxiliary chains having links and joint bolts articulating adjacent links with one another, toothed rack sections arranged on some of the said links at regular intervals, dogs mounted on some of the said links at regular intervals adapted to engage and carry along the said conveyor chains, and a motor driven gear wheel meshing with the said toothed rack sections in succession.

9. A garage as claimed in claim 1, comprising in addition: motor driven endless auxiliary chains having shorter links than the said conveyer chains, guide pulleys guiding the said auxiliary chains, and dogs arranged on the said auxiliary chains engaging the articulation points of the said conveyer chains and carrying the same along between the said guide pulleys.

10. A garage as claimed in claim 1, comprising in addition: endless auxiliary chains having links shorter than those of the said conveyer chains, joint bolts articulating adjacent links of the said auxiliary chains together, alternate links carrying toothed rack sections extending in both directions of the said auxiliary chains beyond the said articulation bolts thereof, leaving between one another in the aligned position gaps corresponding to the interstices between the teeth of the said toothed rack sections, dogs mounted on alternate links of the said auxiliary chains adapted to engage and carry along the said conveyer chains, and a motor driven gear wheel meshing with the said toothed rack sections in succession.

11. A garage as claimed in claim 10, comprising in addition: endless guide rails guiding the free ends of the said joint bolts and having substantially elliptic portions departing from the shape of circular arcs in such a manner that buckling and straining of the links of the said auxiliary chains during their movements along the said guide rails is obviated.

12. A garage as claimed in claim 10, wherein the said dogs are arranged on the same links, pointing outward, as the said toothed racks, pointing inward.

13. A mechanically operated multi-storey garage, comprising in combination: a plurality of floors vertically spaced from one another, a pair of endless conveyer chains passed overhead the individual floors and from one floor to another, carriers capable of accommodating vehicles suspended at the articulation points of the said conveyer chains, an entrance to the said carriers arranged on one of the said floors, a gate opening and closing the said entrance, locking means mounted at the said entrance on the associated floor adapted to engage the carrier actually at a standstill at the said entrance, control means controlling the said locking means and gate in the sense of locking the said carrier at a standstill at the said entrance before opening the said gate and closing the said gate before unlocking the said carrier, guide rails guiding the said conveyer chains having straight portions parallel to the said floors, curved portions leading from one floor to another of a radius of curvature larger than half the height of one storey and inversely curved transition portions leading back the said curved portions to the level of the adjacent straight portion.

14. A mechanically operated multi-storey garage, comprising in combination: a plurality of floors vertically spaced from one another, a pair of endless conveyer chains passed overhead the individual floors and from one floor to another, carriers capable of accommodating vehicles suspended at the articulation points of the said conveyer chains having a bottom, raised thresholds arranged at the entry into and exit from the said bottom for the vehicles to be carried, guide rails guiding the said conveyer chains having straight portions parallel to the said floors, curved portions leading from one floor to another of a radius of curvature larger than half the height of one storey and inversely curved transition portions leading back the said curved portions to the level of the adjacent straight portion.

15. A mechanically operated multi-storey garage, comprising in combination: a plurality of floors vertically spaced from one another, a pair of endless conveyer chains passed overhead the individual floors and from one floor to another, carriers capable of accommodating vehicles suspended at the articulation points of the said conveyer chains, having a bottom, wheels journalled on the underside of the said bottom about axes transverse to the direction of movement of the said conveyer chains, guide rails guiding the said conveyer chains having straight portions parallel to the said floors, curved portions leading from one floor to another and inversely curved transition portions leading back the said curved portions to the level of the adjacent straight portion.

16. A mechanically operated multi-storey garage, comprising in combination: a plurality of floors vertically spaced from one another, a pair of endless conveyer chains passed overhead the individual floors to another, carriers capable of accommodating vehicles suspended at the articulation points of the said conveyer chains having a bottom, wheels journalled on the underside of the said bottom about axes transverse to the direction of movement of the said conveyer chains, an entrance to the said carriers arranged on one of the said floors, the said wheels resting on the floor associated to the said entrance, guide rails guiding the said conveyer chains having straight portions parallel to the said floors, curved portions leading from one floor to another and inversely curved transition portions leading back the said curved portions to the level of the adjacent straight portion.

References Cited in the file of this patent

UNITED STATES PATENTS 1,799,923    Muzyn _____ Apr. 7, 1931

FOREIGN PATENTS 424,923    Germany _____ Feb. 3, 1926